US007660661B2

(12) United States Patent
Asano et al.

(10) Patent No.: US 7,660,661 B2
(45) Date of Patent: Feb. 9, 2010

(54) FUEL INJECTION CONTROL DEVICE

(75) Inventors: Masahiro Asano, Kariya (JP); Eiji Takemoto, Obu (JP)

(73) Assignee: DENSO Corporation, Kariya (JP)

( * ) Notice: Subject to any disclaimer, the term of this patent is extended or adjusted under 35 U.S.C. 154(b) by 428 days.

(21) Appl. No.: 11/599,397

(22) Filed: Nov. 15, 2006

(65) Prior Publication Data

US 2007/0112502 A1 May 17, 2007

(30) Foreign Application Priority Data

Nov. 15, 2005 (JP) ............................ 2005-330634

(51) Int. Cl.
*G06F 19/00* (2006.01)
*F02M 7/00* (2006.01)
*G05D 1/00* (2006.01)

(52) U.S. Cl. ........................ 701/111; 701/104; 123/436

(58) Field of Classification Search ......... 701/103–105, 701/111, 115; 123/436, 478, 480, 445, 486, 123/512, 674, 673
See application file for complete search history.

(56) References Cited

U.S. PATENT DOCUMENTS

| | | | | |
|---|---|---|---|---|
| 5,019,989 | A * | 5/1991 | Ueda et al. | 701/104 |
| 5,073,865 | A * | 12/1991 | Togai et al. | 701/103 |
| 5,248,010 | A * | 9/1993 | Yagi et al. | 180/197 |
| 5,283,742 | A * | 2/1994 | Wazaki et al. | 701/86 |
| 5,555,499 | A * | 9/1996 | Yamashita et al. | 701/84 |
| 6,192,857 | B1 * | 2/2001 | Shimada | 123/322 |
| 6,199,005 | B1 * | 3/2001 | Iwata | 701/87 |
| 6,205,379 | B1 * | 3/2001 | Morisawa et al. | 701/22 |
| 6,449,552 | B2 * | 9/2002 | Ohba et al. | 701/89 |
| 6,520,423 | B1 | 2/2003 | Ricci-Ottati et al. | |
| 6,907,861 | B2 | 6/2005 | Asano et al. | |
| 2006/0180363 | A1 * | 8/2006 | Uchisasai et al. | 180/65.2 |

FOREIGN PATENT DOCUMENTS

| | | | |
|---|---|---|---|
| JP | 63012842 | A * | 1/1988 |
| JP | 06002578 | A * | 1/1994 |
| JP | 2003-254139 | | 9/2003 |

OTHER PUBLICATIONS

French Office Action (with English translation) dated Mar. 21, 2007.

* cited by examiner

*Primary Examiner*—Stephen K Cronin
*Assistant Examiner*—Johnny H Hoang
(74) *Attorney, Agent, or Firm*—Nixon & Vanderhye P.C.

(57) ABSTRACT

A fuel injection control device is disclosed that includes a fuel injection valve for performing a fuel injection event at an assumed fuel quantity. The device also includes a rotation detecting device for detecting a change in rotation amount of the output shaft. The device further includes a slip rate detection device for detecting a slip rate between the output shaft and the driven shaft. Also included is an actual fuel injection amount estimating device for estimating an actual fuel injection quantity during the fuel injection event based on the detected change in rotation and the detected slip rate. The device also includes a learning device for learning a deviation based on the difference between the estimated actual fuel injection quantity and the assumed fuel injection quantity. A related method is also disclosed.

15 Claims, 4 Drawing Sheets

FUEL INJECTION CONTROL DEVICE

CROSS REFERENCE TO RELATED APPLICATION

The following is based on and claims priority to Japanese Patent Application No. 2005-330634, filed Nov. 15, 2005, which is hereby incorporated by reference in its entirety.

FIELD

The following relates to a fuel injection control device and, more specifically, relates to a fuel injection control device for learning a deviation amount in a fuel injection characteristic.

BACKGROUND

Various fuel injection control devices have been proposed for learning a deviation amount in a vehicle fuel injection characteristic. For instance, U.S. Pat. No. 6,907,861 (i.e., Japanese Patent Publication No. 2005-036788) proposes a fuel injection control device for a vehicle with a diesel engine. When the clutch is disengaged, a deviation amount of a fuel injection characteristic is learned. More specially, when the learning condition is met, a single fuel injection is performed and an increase amount of rotation of the output shaft of the engine is detected. Since the clutch is disengaged and the output shaft is disconnected from the driven shaft, the increase amount of the rotation has a strong correlation with a fuel quantity actually injected. Thus, this procedure provides an accurate measurement (learning) of any deviation in fuel injection characteristic.

The above control device, however, has certain disadvantages. Specifically, there are relatively few opportunities for learning since learning is performed only when the output shaft for the diesel engine is disconnected from the drive wheels. For instance, if this system is incorporated in a vehicle with an automatic transmission, learning occurs when the shift lever is in a neutral position. Thus, there are relatively few opportunities for learning. (It is understood that if this learning processes occur in a state other than when the shift lever is in the neutral position, the learning accuracy can be degraded. This is because if the same quantity of fuel is injected, the output shaft rotation caused by the fuel injection varies depending on the connection state between the engine output shaft and the driven shaft through a torque converter.)

Thus, there exists a need for a fuel injection control device that overcomes the above-mentioned problems in the conventional art. As will be explained, the following disclosure addresses this need as well as other needs, which will become apparent to those skilled in the art.

SUMMARY

A fuel injection control device is disclosed for a vehicle with an engine, an output shaft, and a driven shaft. The fuel injection control device includes a fuel injection valve for performing a fuel injection event in which fuel is injected into the engine at an assumed fuel injection quantity. The device also includes a rotation detecting device for detecting a change in rotation amount of the output shaft due to the fuel injection event. Also, the device includes a slip rate detection device for detecting a slip rate between the output shaft and the driven shaft due to the fuel injection event. Moreover, the device includes an actual fuel injection amount estimating device for estimating an actual fuel injection quantity during the fuel injection event based on the detected change in rotation and the detected slip rate. Additionally, the device includes a learning device for learning a deviation based on the difference between the estimated actual fuel injection quantity and the assumed fuel injection quantity.

A method of learning a fuel injection deviation is also disclosed for a vehicle with a output shaft and a driven shaft. The method includes performing a fuel injection event at an assumed fuel injection quantity, detecting a change in rotation of the output shaft due to the fuel injection event, and detecting a slip rate between the output shaft and the driven shaft due to the fuel injection event. The method further includes estimating an actual fuel injection quantity during the fuel injection event based on the detected change in rotation and the detected slip rate, and learning a fuel injection deviation based on the difference between the estimated actual fuel injection quantity and the assumed fuel injection quantity.

BRIEF DESCRIPTION OF THE DRAWINGS

Other objects, features, and advantages of the will become more apparent from the following detailed description made with reference to the accompanying drawings, in which like portions are designated by like reference numbers and in which.

DETAILED DESCRIPTION OF EXAMPLE EMBODIMENT

With reference to the accompanying drawings, there will be explained a fuel injection control device in a first embodiment of the present invention which is applied to a fuel injection control device for a diesel engine.

Figure 1:
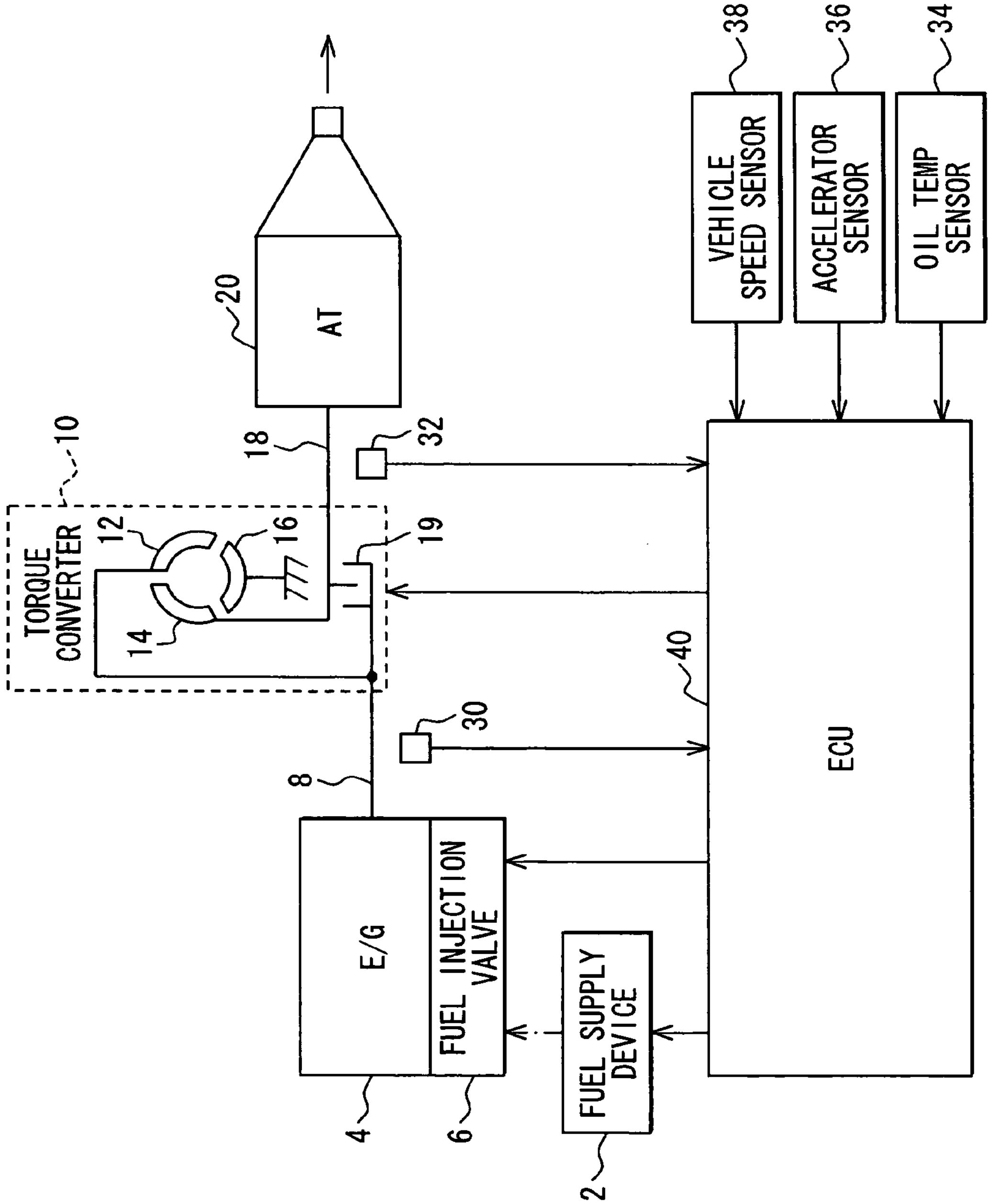
FIG. 1 is a schematic illustration of one embodiment of an engine system.

One embodiment of an engine system is shown in FIG. 1. The engine system includes a fuel supply device 2. The fuel supply device 2 includes a fuel tank, a fuel pump for sucking fuel from the fuel tank, a common rail to which fuel is pressurized and supplied from the fuel pump, and the like. The engine system also includes a diesel engine 4 provided with a plurality of fuel injection valves 6. The engine system also includes an output shaft (i.e., a crank shaft 8) of the diesel engine 4. The crank shaft 8 is coupled to a torque converter 10 (i.e., coupling device).

The torque converter 10 includes a pump impeller 12 and a turbine runner 14 opposed from each other, which constitute a fluid coupling. A stator 16 for rectifying flow of oil is located between the pump impeller 12 and the turbine runner 14. The pump impeller 12 is coupled to the crank shaft 8, and the turbine runner 14 is coupled to a driven shaft 18 (i.e., an output shaft of the torque converter 10). In addition, the torque converter 10 is provided with a lockup clutch 19 for coupling and uncoupling of the crank shaft 8 and the driven shaft 18.

The torque converter 10 is filled with an operating oil (viscosity fluid), whereby rotation of the crank shaft 8 can be transmitted to the driven shaft 18 while allowing slip of the driven shaft 18 relative to the crank shaft 8. Further, when the crank shaft 8 is mechanically coupled to the driven shaft 18 by the lockup clutch 19, a relative rotational speed between the crank shaft 8 and the driven shaft 18 is approximately zero.

The driven shaft 18 is coupled to an automatic transmission 20. The automatic transmission 20 changes a rotational speed of the driven shaft 18 and outputs the changed rotational speed to the side of the drive wheels.

The above engine system is provided with various sensors, such as a crank angle sensor 30 (i.e., a rotation detecting device) for detecting a rotational angle of the crank shaft 8, a turbine rotational sensor 32 for detecting a rotational angle of the driven shaft 18, an oil temperature sensor 34 for detecting a temperature of an operating oil inside the torque converter 10, a pedal position sensor 36 for detecting the position of the accelerator pedal, and a vehicle speed sensor 38 for detecting a running speed of the vehicle.

The engine system also includes an electric control unit 40 (i.e., ECU), which includes a microcomputer and operates the fuel supply device 2, the fuel injection valve 6, the lockup clutch 19, and the like based upon detection values of the above sensors to control operation of the vehicle. For example, the ECU 40 calculates a fuel injection quantity required for generating an output torque of the diesel engine 4 in response to the position of the accelerator pedal, rotational speed of the crank shaft 8, etc. Then, the ECU 40 operates the fuel injection valve 6 based upon the calculated fuel injection quantity to control output of the diesel engine 4. In addition, for example, when the lockup clutch 19 is locked, a relative rotational speed between the crank shaft 8 and the driven shaft 18 reduces to zero, thereby reducing torque losses.

Furthermore, the ECU 40 includes an actual fuel injection amount estimating device for estimating an "actual fuel injection quantity." The ECU 40 further includes a learning device for learning a "fuel injection characteristic amount deviation" during learning processes to be described. Generally, during learning processes, a fuel injection event occurs in which the fuel injection valve 6 injects an assumed fuel injection quantity. Then, the actual fuel injection amount estimating device estimates the actual fuel injection quantity according to the effects of the fuel injection event. Next, the learning device finds the difference between the estimated actual fuel injection quantity and the assumed fuel injection quantity in order to learn the fuel injection characteristic amount deviation. As will be explained, this process allows for accurate and more frequent deviation learning for better operation of the engine 4.

Figure 2:
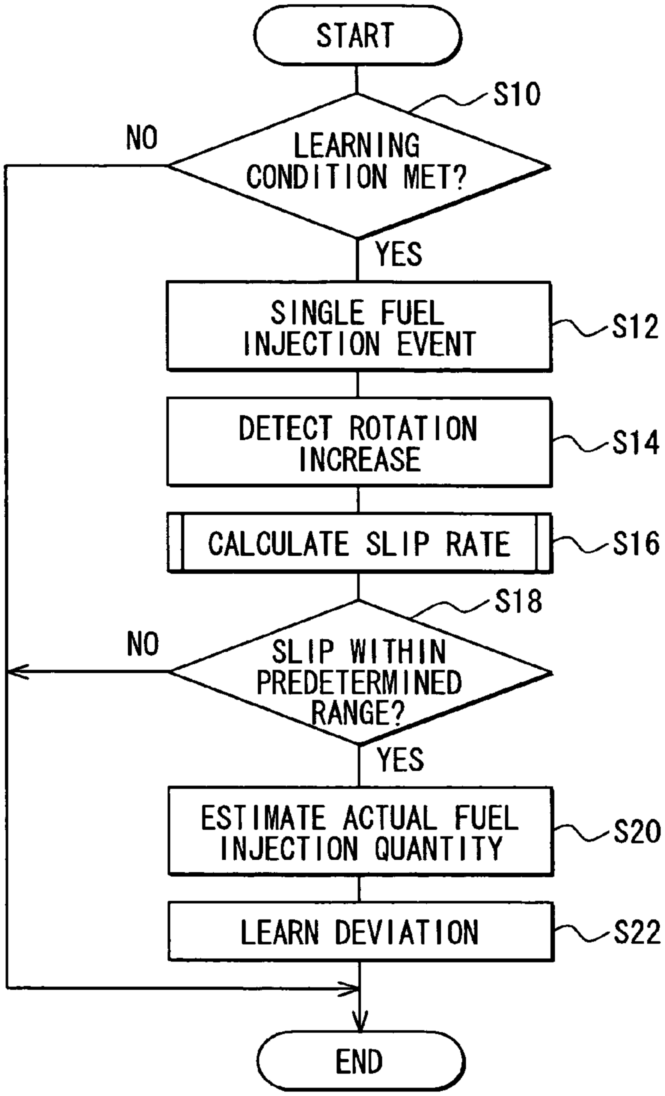
FIG. 2 is a flow chart illustrating one embodiment of a fuel injection process for the engine system of FIG. 1.

Referring to FIG. 2, one embodiment of the learning processing is illustrated. In this embodiment, a learning value is learned to compensate for fuel injection variations when performing a minute injection. Herein "minute injection" encompasses pilot injection, pre-injection, after-injection, or the like performed before or after primary injection for generating the desired output torque. Also, the "minute injection" has a fuel injection quantity substantially smaller than that of the main injection.

In general, the learning process includes estimating an actual fuel injection quantity based upon a rotational state of the crank shaft 8 caused by the fuel injection event. It will be appreciated that since the rotational state of the crank shaft 8 varies depending on the connection state between the crank shaft 8 and the driven shaft 18 through the torque converter 10, even if the same quantity of fuel is injected, the actual fuel injection quantity is not determined directly from the rotational state of the crank shaft 8. Therefore, a slip rate (i.e., the difference in rotation speed) between the crank shaft 8 and the driven shaft 18 is taken into account when evaluating the effect of the fuel injection event.

In one embodiment, the process represented in FIG. 2 is repeatedly executed at a predetermined cycle by the ECU 40. Beginning in step S10, it is determined whether or not a learning condition is met. In one embodiment, the learning condition is met when an accelerator pedal is released by the driver such that the vehicle decelerates and such that a fuel cut control is performed such that fuel injection stops. As will be understood, learning the learning value while the vehicle decelerates and while fuel injection is stopped allows an actual fuel injection quantity to be estimated using a change in (e.g., increase) amount of rotation of the crank shaft 8 due to the fuel injection event.

In one embodiment, while the learning condition is met, the vehicle decelerates, and fuel injection is stopped, control for disengaging the lockup clutch 19 is performed in order to avoid transmission of jolts occurring due to an abrupt increase of an output torque of the diesel engine 4 to the vehicle when re-accelerating the vehicle. As a result, in the first embodiment, a learning value is learned when the crank shaft 8 and the driven shaft 18 are not connected so that they do not slip with each other, thus learning the deviation amount with a high accuracy. That is, when the lockup clutch 19 is locked, the crank shaft 8 and the driven shaft 18 rotate together integrally as a uniform rotational element, and therefore, the rotational state of the crank shaft 8 is directly subject to the rotational fluctuations of the uniform rotational element due to torsional force or the like. On the other hand, when the lockup clutch 19 is disengaged, the influence of the driven shaft 18 on the rotation of the crank shaft 8 can be considered an outside disturbance of the crank shaft 8. Yet, since slip is allowed between the crank shaft 8 and the driven shaft 18, the rotational fluctuations on the side of the driven shaft 18 are transmitted to the crank shaft 8 in such a manner as to be reduced, and it is possible to improve learning accuracy despite rotational fluctuations at the side of the driven shaft 18.

If step S10 is answered negatively, the process ends, but if step S10 is answered affirmatively, step S12 follows. In step S12, a fuel injection event is performed by the fuel injection valve 6. In one embodiment, the fuel injection event is a single fuel injection. That is, by operating the fuel injection valve 6, a single fuel injection at an assumed fuel injection quantity (e.g., the amount for the minute fuel injection of pilot injection or the like) is performed. More specifically, a command fuel injection period of the fuel injection valve 6 is calculated from a fuel pressure in the common rail and a fuel injection quantity corresponding to the desired minute fuel injection quantity, and the fuel injection valve 6 is controlled for opening in accordance with the command fuel injection period. The calculation of the command fuel injection period is made assuming that the fuel injection valve 6 has a prescribed reference characteristic. Here, it is preferable that the reference characteristic is a so-called central characteristic (i.e., a characteristic produced by averaging characteristic variations at the time of mass production of the fuel injection valves 6).

Next, in step S14, an increase amount of the rotational speed of the crank shaft 8 is detected. In this embodiment, the fuel injection event is a single fuel injection by the fuel injection valve 6 of the first cylinder. Thus, the rotational speed of the crank shaft 8 in a case where the single fuel injection is not performed at the single fuel injection timing is expressed as "ω(i−1)+a×t" using the rotational speed ω(i−1) before 720° CA, a reducing speed "a" of the rotational speed before 720° CA, and time "t" required for rotation of 720° CA by the time of the single fuel injection. Accordingly, the increased amount of rotation caused by the single fuel injection is expressed as "ω(i)−ω(i−1)−a×t".

Next in step S16, a slip rate between the crank shaft 8 and the driven shaft 18 at the time of the single fuel injection is calculated. This slip rate may be calculated by quantifying deviation amounts in rotational speed of the driven shaft 18 to the crank shaft 8.

Figure 3:
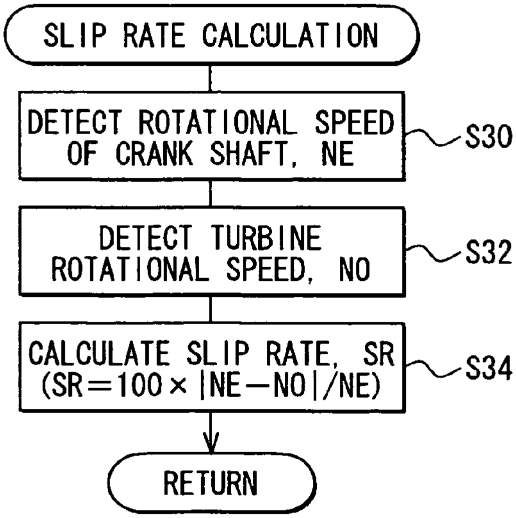
FIG. 3 is a flow chart illustrating a slip rate calculation process of the embodiment of FIG. 2.

In this embodiment, the slip rate is quantified as shown in FIG. 3. That is, a slip rate SR is quantified by the expression "SR=100×|NE−NO|/NE" using, a rotational speed NE (step S30) of the crank shaft 8 detected by the crank angle sensor 30 and a rotational speed NO (step S32) of the driven shaft 18 detected by the turbine rotational sensor 32 (step S34). Thus, it is understood that the crank angle sensor 30, the turbine rotational sensor 32, and the ECU 40 constitute a "slip rate detection device" that detects the slip rate.

Next, at step S18 of FIG. 2, it is determined whether the calculated slip rate is within a predetermined range. The predetermined range corresponds to a slip rate in which a relation between the single fuel injection quantity and the increase amount of rotation of the crank shaft 8 is apparent. In one embodiment, the predetermined range is just above zero and above. It will be appreciated that in the region where the slip rate is extremely close to zero, even if the influence of the side of the driven shaft 18 to rotation of the crank shaft 8 can be treated as the outside disturbance, the outside disturbance becomes substantial. Therefore, in this embodiment, learning accuracy is improved by ignoring the region where the slip rate is extremely close to zero.

If step S18 is answered negatively, the process ends. However, if step S18 is answered affirmatively, step S20 follows, and an actual fuel injection quantity during the single fuel injection is estimated based upon the increased amount of rotation detected at step S14 and a slip rate of the torque converter 10 detected at step S16. It is understood that the ECU 40 is utilized to estimate the actual fuel injection amount such that the ECU 40 is an "actual fuel injection amount estimating device."

Figure 4:
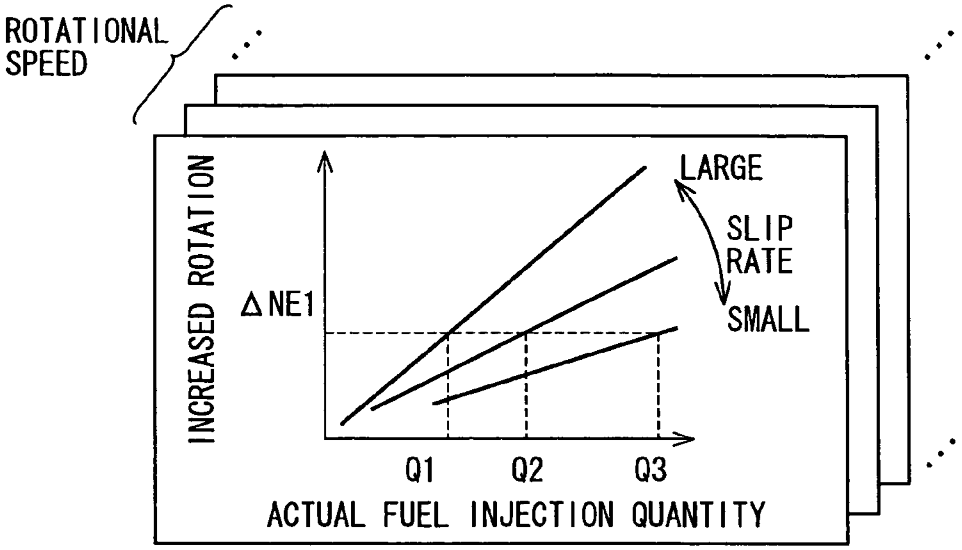
FIG. 4 is a diagram showing a map for estimating an actual fuel injection quantity of the embodiment of FIG. 2.

In one embodiment, step S20 involves utilizing a map, such as the map shown in FIG. 4, which defines a relation between a rotational speed, an increase amount of rotation, an actual fuel injection quantity, and a slip rate at the time of the single fuel injection. This map defines a relation between the increased amount of rotation of the crank shaft 8 and the actual fuel injection quantity by ignoring the rotational change due to slip.

Specifically, in the map shown in FIG. 4, when there is a larger rotational change, an actual fuel injection quantity is larger. In addition, it is estimated that as a slip rate increases, an actual fuel injection quantity becomes smaller. Therefore, the actual fuel injection quantity to the increase amount of rotation ΔNE1 is estimated as various values (Q1 to Q3 in the figure) in accordance with the slip rate. In other words, the map defines a relationship between a single fuel injection quantity and the crank shaft 8 rotation change with a slip rate within the range defined at step S18.

Referring back to FIG. 2, step S22 follows in the process. In step S22, a learning value is learned based upon the estimated actual fuel injection quantity. This learning value is learned by the ECU 40 such that the ECU 40 is a "learning device." Specifically, the learning value is based on the difference between the assumed fuel injection quantity of step S12 and the estimated actual fuel injection quantity of step S20. In other words, this difference is considered to occur due to variations of fuel injection characteristics of the fuel injection valve 6 (i.e., deviation from the reference characteristic).

Figure 5:
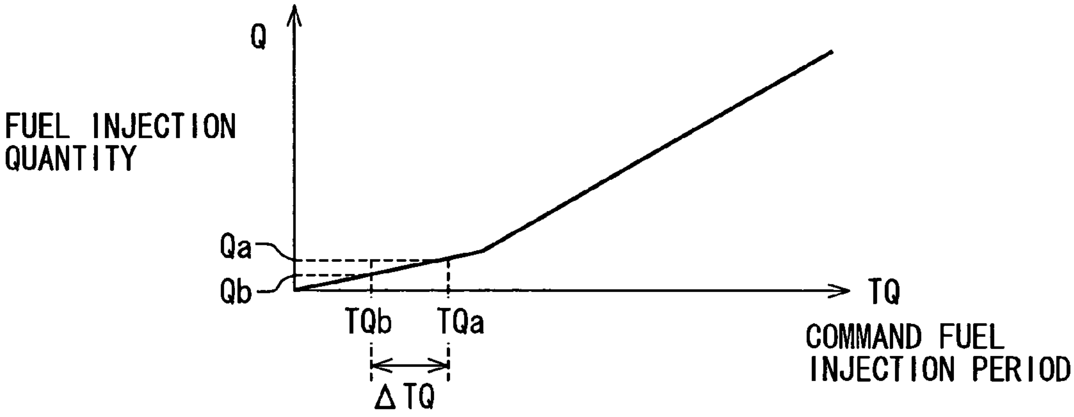
FIG. 5 is a graph showing a calculation method for a learning value of the embodiment of FIG. 2.

For example, when a fuel injection quantity assumed by a single fuel injection is Qa as illustrated in FIG. 5, the single fuel injection is performed for a command fuel injection period TQa. When a fuel injection quantity Qb to be estimated is smaller than the fuel injection quantity Qa, a learning value as a correction value of a command fuel injection period is learned based upon a difference ΔTQ between the command fuel injection period TQb corresponding to the fuel injection quantity Qb and the command fuel injection period TQa. This learning value may be quantified as a correction value of a fuel injection quantity in place of a correction value of the command fuel injection period.

It is noted that the relation between the fuel injection quantity exemplified in FIG. 5 and the command fuel injection period can vary with fuel pressure in the common rail. Thus, in one embodiment learning occurs for each learning value in accordance with the fuel pressure in the common rail.

Also, when the process at step S22 of FIG. 2 is completed, or when "NO" is determined at step S10 or at step S18, the process ends.

Thus, an actual fuel injection quantity by a single fuel injection is estimated based upon a detected increase amount of rotation and a detected slip rate caused by the single fuel injection. Thereby, a difference between an assumed fuel injection quantity and the estimated actual fuel injection quantity can be accurately detected as the variation of fuel injection characteristic of the fuel injection valve 6. This results in learning a highly accurate learning value. Further, the learning value can be learned without limiting the connecting state between the crank shaft 8 and the driven shaft 18 through the torque converter 10 to a single state. Therefore, the learning opportunities can be increased.

Furthermore, even where the diesel engine 4 is a multi cylinder engine, it can be easily specified that the increase amount of rotation of the crank shaft is made by the single fuel injection of a specific fuel injection valve 6, by performing the learning at the time of decelerating and when fuel injection is otherwise stopped. Further, there is the region where the lockup clutch 19 is disengaged at the time of decelerating with no fuel injection, and in this region, a learning value can be learned with high accuracy.

Moreover, a slip rate is calculated based upon detection values of the rotational speed of the crank shaft 8 and the rotational speed of the driven shaft 18, thereby calculating the slip rate accurately.

Additionally, in this embodiment, the vehicle has an automatic transmission. Even though the connecting state between the crank shaft 8 and the driven shaft 18 through the torque converter 10 varies, the above results can be achieved.

Figure 6:
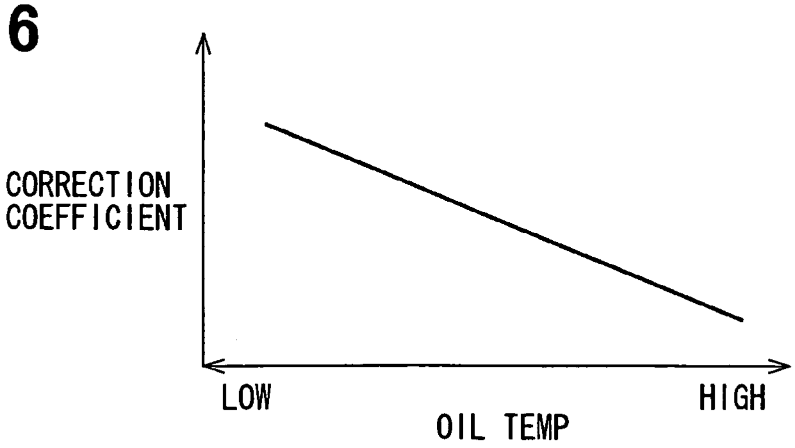
FIG. 6 is a graph showing another embodiment of a map used for calculating an actual fuel injection quantity.

Another embodiment is illustrated in FIG. 6. In this embodiment, the actual fuel injection quantity is estimated based upon temperature of operating oil in the torque converter 10. The temperature of the oil is detected by the oil temperature sensor 34. In one embodiment, the actual fuel injection quantity is estimated based on the oil temperature, the increased rotation of the crank shaft 8, and the slip rate detected at the time of the fuel injection event. It will be understood that the operating oil has higher viscosity as oil temperature decreases; therefore as oil temperature decreases, the influence from the driven shaft 18 to the crank shaft 8 increases. As such, actual fuel injection quantity is estimated based upon an oil temperature having a correlation with operating oil viscosity. A learning value can be learned by appropriately eliminating the changing amount due to the state of the torque converter 10 from the changing rotational amount of the crank shaft 8 for the same fuel injection quantity.

More specifically, in this embodiment, as shown in FIG. 6, an actual fuel injection quantity estimated at step S20 of FIG. 2 is corrected by using a map defining a relation between an oil temperature and a correction coefficient of the actual fuel injection quantity. As shown in the map of FIG. 6, as the temperature of the operating oil increases, the correction coefficient is reduced. Thus, as the oil temperature increases, the correction coefficient causes the actual fuel injection quantity to be estimated as a smaller value. Accordingly, application of the correction coefficient allows for more accurate learning.

Figure 7:
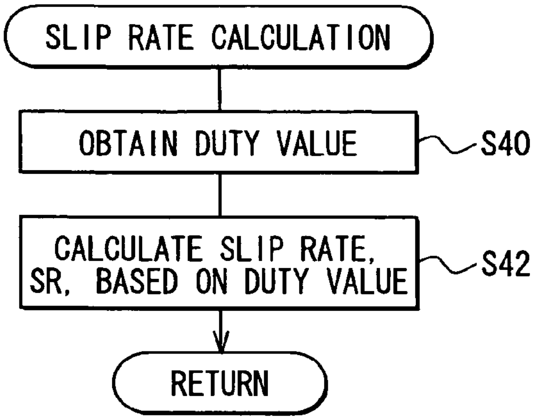
FIG. 7 is a flow chart showing a slip rate calculation process in another embodiment.

Referring now to FIG. 7, another embodiment is illustrated. In this embodiment, when the accelerator pedal is released and the vehicle decelerates, a pushing force of the lockup clutch 19 to the crank shaft 8 and the driven shaft 18 is slightly reduced. At this time, a flex lockup control is also performed allowing slip between the crank shaft 8 and the driven shaft 18, and fuel cut control is thereby delayed. In other words, fuel cut control during decelerating is cancelled when the rotational speed of the crank shaft 8 is below a predetermined value, and the flex lockup control prevents the rotational speed of the crank shaft 8 from being abruptly reduced. Thus, in this embodiment, a slip rate is calculated when performing the flex lockup control, as shown in FIG. 7.

More specifically, beginning at step S40, a duty value (i.e., an operational value) is obtained at the time of the flex lockup. The duty value is used to define a pushing force of the lockup clutch 19 to the crank shaft 8 and the driven shaft 18. Then, in step S42, a slip rate is calculated based upon the duty value. More specially, a slip rate SR is calculated on a map based upon the duty value. Slip rate varies with rotational speed of the crank shaft 8, and therefore, even if the pushing force is the same, the slip rate can be calculated in consideration of the rotational speed of the crank shaft 8 or the like in addition to the duty value.

Figure 8:
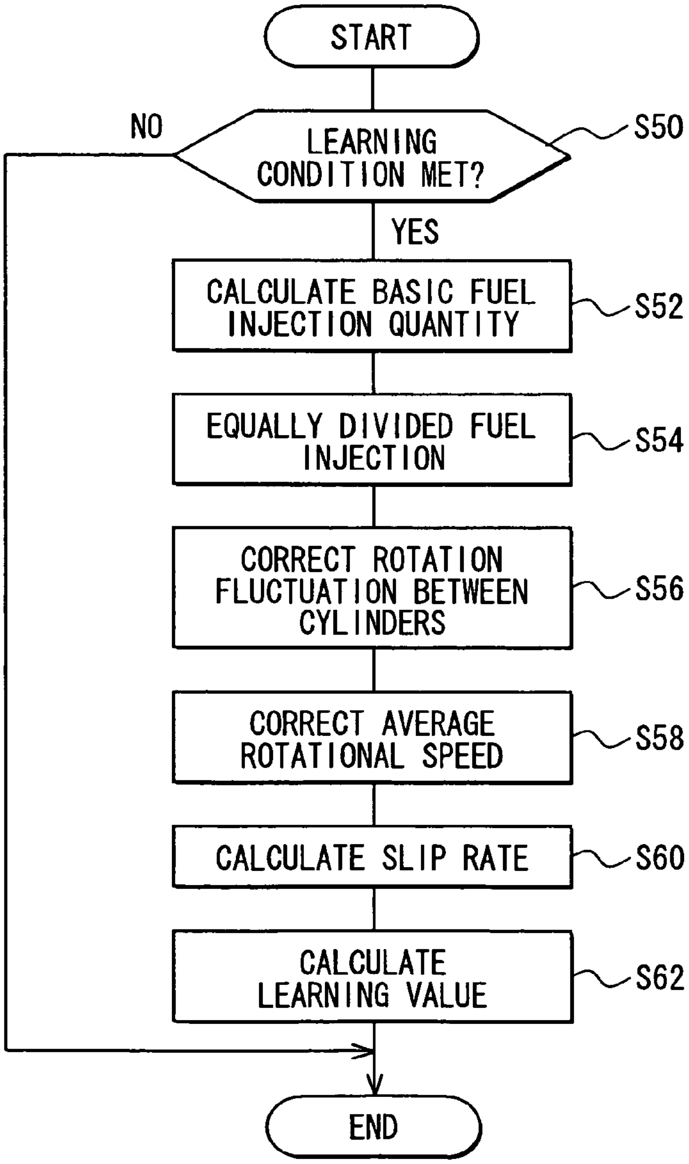
FIG. 8 is a flow chart showing another embodiment of the fuel injection process.

Referring now to FIG. 8, another embodiment for learning a learning value is illustrated. In this embodiment, the process is repeatedly executed at a predetermined cycle by the ECU 40.

Beginning in step S50, it is determined whether or not a learning condition is met. This learning condition met, for example, when the engine is operating during idling stabilization and also vehicle speed detected by the vehicle speed sensor 38 is other than zero. Thus, since the lockup clutch 19 is not locked, learning can be performed while reducing influence applied from the driven shaft 18 to the crank shaft 8.

Next at step S52, a basic fuel injection quantity is calculated. This basic fuel injection quantity is set as an assumed fuel injection quantity necessary for the idling stabilization control when a creep operation is made in a predetermined slip rate (i.e., a value as large as possible) during idling.

Subsequently, at step S54, the basic fuel injection quantity is divided into n equal parts for injecting so that each fuel injection quantity corresponds to the above-mentioned minute fuel injection quantity. This process aims at detecting variations of fuel injection characteristic of the fuel injection valve 6 upon performing the minute fuel injection such as pilot injection. The fuel injection is performed with equally divided parts after the fuel quantity, which is 1/n times the basic fuel injection quantity n, is corrected in consideration of the influence of intervals between fuel injections. This may be performed in a manner as described in Japanese Patent Publication No. 2003-254139.

Next in step S56, a fuel injection quantity for each cylinder is corrected (i.e., FCCB correction) to compensate for variations of the changing amount of the rotational speed of the crank shaft 8 due to variations of fuel injection characteristic of the fuel injection valve 6 in each cylinder. More specially, each fuel injection quantity of n times of fuel injection quantities is corrected with FCCB correction quantity/n. The process may occur according to Japanese Patent Publication No. 2003-254139.

Subsequently, in step S58, each fuel injection quantity of each cylinder is corrected by the same correction amount (i.e., ISC correction amount) to thereby make an average rotational speed of the crank shaft 8 equal to a target rotational speed. More specifically, each fuel injection quantity of n times of fuel injection quantities is corrected with ISC correction quantity/n. In one embodiment, the process occurs as described in Japanese Patent Publication No. 2003-254139.

Next in step S60, a slip rate is calculated. Then, in step S62, a learning value is learned based upon the FCCB correction amount, the ISC correction amount, and the slip rate.

Accordingly, the rotational state of the crank shaft 8 during idling is not defined directly from the fuel injection quantity but varies with the connecting state between the crank shaft 8 and the driven shaft 18 through the torque converter 10. Therefore, a sum of "FCCB correction amount" and "ISC correction amount" shows a deviation amount from the basic fuel injection quantity. The factor of the deviation includes not only variations of fuel injection characteristic of the fuel injection valve 6 but also the deviation of an actual slip rate from a predetermined slip rate assumed from the basic fuel injection quantity. Accordingly, the deviation amount due to the actual slip rate from the predetermined slip rate is eliminated from the deviation amount (FCCB correction amount+ISC correction amount) from the basic fuel injection quantity required for control of idling stabilization. This process can be executed, for example, by preparing a map showing a relation between a deviation amount of an actual slip rate from a predetermined slip rate and a correction value. As a result, the learning value can be obtained by reducing "correction value/n" from a sum of "FCCB correction amount/n" and "ISC correction amount/n".

In the above series of the processes, when the vehicle speed is other than zero, a force applied to the crank shaft 8 varies with a road surface. Therefore, it is preferable to add, for example, a condition of "when the road surface is flat" to the learning condition. In addition, since a force applied to the crank shaft 8 varies with a total weight of a vehicle, for example, an occupant sensor for detecting presence/absence of a passenger on each seat of the vehicle may be used to detect the number of the passengers, and a basic fuel injection quantity may be calculated in response to the total weight of the vehicle calculated in accordance with the number of the passengers detected.

In each of the embodiments, for learning the learning value during deceleration when fuel injection is terminated, if the torque applied from the drive wheels to the driven shaft 18 is constant, the torque need not be considered particularly. Also, as in the case of the embodiment of FIG. 8, during engine conditions other than decelerating with terminated fuel injection, even if the torque applied to the driven shaft 18 through the drive wheels is constant, means for the influence of the torque may be necessary. Yet even in the case of considering the torque applied to the driven shaft 18, the influence of the torque to the crank shaft 8 varies with the connecting state of the torque converter 10. Therefore, for learning the learning value, it may be necessary to consider the connecting state of the torque converter 10.

It will be appreciated that the above embodiments may be modified in a variety of ways without departing from the scope of the invention. For instance, even if the pushing force of the lockup clutch 19 is the same, a slip rate varies as the viscosity of the operating oil increases; therefore, a temperature of the operating oil may be added for calculating the slip rate.

Also, the calculating methods of a slip rate are not limited to the above embodiments. For example, a rotational speed of the driven shaft 18 may be detected from a gear ratio of the automatic transmission 20 and an output rotational speed of the automatic transmission 20, and a slip rate may be calculated based upon this rotational speed of the driven shaft 18 and the rotational speed of the crank shaft 8. Furthermore, considering that slip rate has a strong correlation particularly with operating oil viscosity when the lockup clutch 19 is disengaged, the slip rate may be calculated from a temperature of the operating oil during disengagement of the lockup clutch 19.

A parameter having a correlation with viscosity of an operating oil inside the torque converter 10 is not limited to a temperature of the operating oil. For example, since a cooling water temperature of the diesel engine 4 or the like has a correlation with a temperature of the operating oil, the cooling water temperature becomes a parameter correlated with the viscosity of the operating oil.

The method for estimating a fuel injection quantity based upon a changing amount of rotation of the crank shaft 8 having a correlation with a fuel injection quantity is not limited to an increase amount of rotation shown in the above embodiment. For example, an output torque of the engine 4 calculated in a manner as exemplified in Japanese Patent Publication No. 2005-36788 may be used.

Furthermore, each of the above embodiments is applied to a vehicle with an automatic transmission, but those embodiments and modifications thereof may be applied to a vehicle with a manual transmission. For instance, a learning value can be highly accurately learned at a half-clutching state, thereby increasing the opportunities for learning.

The method for learning is not limited to learning a learning value with respect to minute fuel injection. This can be realized, for example, by not dividing a fuel injection quantity into equal parts.

Moreover, the fuel injection valve 6 is not limited to a manner where a fuel injection quantity is defined directly from a fuel pressure and a command fuel injection period. For example, as disclosed in U.S. Pat. No. 6,520,423, if the fuel injection valve 6 can sequentially adjust a lift amount of a needle nozzle in response to a displacement of an actuator, a fuel injection quantity may not be accurately defined directly from the fuel injection period and the fuel pressure. Thus, an operational amount of the fuel injection valve 6 is instead defined, for example, by an energy amount supplied to the actuator and a period for supplying the energy (i.e., fuel injection period) and a fuel injection quantity is defined by the fuel pressure, the energy amount and the fuel injection period. Therefore, it is preferable to learn a learning value of at least one of the energy amount and the fuel injection period.

In each of the above embodiments, for learning the deviation amount of the fuel injection characteristic, a correction value of the command fuel injection period is calculated. In another embodiment, a correction value of a command value for a fuel injection quantity is calculated. Further, in place of learning a deviation amount of the fuel injection characteristic as a value for compensating for the variation of the fuel injection characteristic (i.e., one mode of the deviation amount of the fuel injection characteristic), a deviation amount from the reference fuel injection characteristic itself may be directly learned. In this case, for each time of injecting fuel in the ECU 40, a correction value is calculated for compensating for the variation of the fuel injection characteristic based upon the deviation amount.

Additionally, the in-vehicle internal combustion engine is not limited to a diesel engine, but may any suitable engine, such as a gasoline engine.

While only the selected example embodiments have been chosen to illustrate the present invention, it will be apparent to those skilled in the art from this disclosure that various changes and modifications can be made therein without departing from the scope of the invention as defined in the appended claims. Furthermore, the foregoing description of the example embodiments according to the present invention is provided for illustration only, and not for the purpose of limiting the invention as defined by the appended claims and their equivalents.

What is claimed is:

1. A method of learning a fuel injection deviation for a vehicle with an output shaft and a driven shaft, the method comprising:

performing a fuel injection event at an assumed fuel injection quantity;

detecting a change in rotation of the output shaft due to the fuel injection event;

detecting a slip rate between the output shaft and the driven shaft due to the fuel injection event;

estimating an actual fuel injection quantity during the fuel injection event based on the detected change in rotation and the detected slip rate; and learning a fuel injection deviation based on the difference between the estimated actual fuel injection quantity and the assumed fuel injection quantity.

2. The method according to claim 1, wherein performing the fuel injection event occurs when slip is allowed between the output shaft and the driven shaft.

3. The method according to claim 1, wherein detecting the slip rate further comprises detecting the slip rate based upon a detection value of a rotational speed of the output shaft and a detection value of a rotational speed of the driven shaft.

4. The method according to claim 1, wherein learning the fuel injection deviation occurs during deceleration and when fuel injection is terminated.

5. The method according to claim 1, wherein learning the fuel injection deviation further comprises learning the fuel injection deviation when performing minute fuel injection.

6. A method of learning a fuel injection deviation for a vehicle with an output shaft and a driven shaft, the method comprising:

performing a fuel injection event at an assumed fuel injection quantity;

detecting a change in rotation of the output shaft due to the fuel injection event;

detecting a slip rate between the output shaft and the driven shaft due to the fuel injection event;

estimating an actual fuel injection quantity during the fuel injection event based on the detected change in rotation and the detected slip rate; and learning a fuel injection deviation in a fuel injection characteristic quantity based on the difference between the estimated actual fuel injection quantity and the assumed fuel injection quantity, wherein estimating the actual fuel injection quantity further comprises estimating the actual fuel injection quantity based further on a temperature of a fluid that transmits rotation of the output shaft to the driven shaft.

7. A method of learning a fuel injection deviation for a vehicle with an output shaft and a driven shaft, the method comprising:

performing a fuel injection event at an assumed fuel injection quantity;

detecting a chance in rotation of the output shaft due to the fuel injection event;

detecting a slip rate between the output shaft and the driven shaft due to the fuel injection event;

estimating an actual fuel injection quantity during the fuel injection event based on the detected change in rotation and the detected slip rate; and learning a fuel injection deviation in a fuel injection characteristic quantity based on the difference between the estimated actual fuel injection quantity and the assumed fuel injection quantity, wherein the vehicle further comprises a connecting device for transmitting rotation of the output shaft to the driven shaft by controlling a pushing force of a clutch to the output shaft and the driven shaft, and wherein detecting the slip rate further comprises detecting the slip rate based upon a value of the pushing force of the clutch.

8. A fuel injection control device for a vehicle with an engine, an output shaft, and a driven shaft, the fuel injection control device comprising:

a fuel injection valve for performing a fuel injection event in which fuel is injected into the engine at an assumed fuel injection quantity;

a rotation detecting device for detecting a change in rotation amount of the output shaft due to the fuel injection event;

a slip rate detection device for detecting a slip rate between the output shaft and the driven shaft due to the fuel injection event;

an actual fuel injection amount estimating device for estimating an actual fuel injection quantity during the fuel injection event based on the detected change in rotation and the detected slip rate; and a learning device for learning a deviation in a fuel injection characteristic quantity based on the difference between the estimated actual fuel injection quantity and the assumed fuel injection quantity.

9. A fuel injection control device according to claim 8, wherein the fuel injection valve performs the fuel injection event when slip is allowed between the output shaft and the driven shaft.

10. A fuel injection control device according to claim 8, wherein the slip rate detection device detects the slip rate based upon a detection value of a rotational speed of the output shaft and a detection value of a rotational speed of the driven shaft.

11. A fuel injection control device according to claim 8, wherein the learning device performs the learning during deceleration and when fuel injection is terminated.

12. A fuel injection control device according to claim 8, wherein the vehicle further comprises an automatic transmission and a torque converter connecting the automatic transmission to the output shaft.

13. A fuel injection control device according to claim 8, wherein the engine is a diesel engine, and the learning device learns the deviation when performing minute fuel injection with the fuel injection valve.

14. A fuel injection control device with an engine, an output shaft, and a driven shaft, the fuel injection control device comprising:

a fuel injection valve for performing a fuel injection event in which fuel is injected into the engine at an assumed fuel injection quantity;

a rotation detecting device for detecting a change in rotation amount of the output shaft due to the fuel injection event;

a slip rate detection device for detecting a slip rate between the output shaft and the driven shaft due to the fuel injection event;

an actual fuel injection amount estimating device for estimating an actual fuel injection quantity during the fuel injection event based on the detected change in rotation and the detected slip rate; and a learning device for learning a deviation in a fuel injection characteristic quantity based on the difference between the estimated actual fuel injection quantity and the assumed fuel injection quantity, wherein the vehicle further comprises a coupling device for transmitting rotation of the output shaft to the driven shaft through a fluid, and wherein the actual fuel injection amount estimating device estimates the actual fuel injection quantity based further on a temperature of the fluid.

15. A fuel injection control device with an engine, an output shaft, and a driven shaft, the fuel injection control device comprising:

a fuel injection valve for performing a fuel injection event in which fuel is injected into the engine at an assumed fuel injection quantity;

a rotation detecting device for detecting a change in rotation amount of the output shaft due to the fuel injection event;

a slip rate detection device for detecting a slip rate between the output shaft and the driven shaft due to the fuel injection event;

an actual fuel injection amount estimating device for estimating an actual fuel injection quantity during the fuel injection event based on the detected change in rotation and the detected slip rate; and a learning device for learning a deviation in a fuel injection characteristic quantity based on the difference between the estimated actual fuel injection quantity and the assumed fuel injection quantity, wherein the vehicle further comprises a connecting device for transmitting rotation of the output shaft to the driven shaft by controlling a pushing force of a clutch to the output shaft and the driven shaft, and wherein the slip rate detection device detects the slip rate based upon a value of the pushing force of the clutch.

* * * * *